United States Patent Office 3,801,687
Patented Apr. 2, 1974

3,801,687
HEAT COMPRESSIBLE POLYETHERURETHANE
FOAMS
David S. Cobbledick, Kent, Ohio, assignor to The General
Tire & Rubber Company, Summit, Ohio
No Drawing. Filed Mar. 10, 1972, Ser. No. 233,722
Int. Cl. B29c 5/00
U.S. Cl. 264—54          9 Claims

ABSTRACT OF THE DISCLOSURE

Polyurethane foam produced from the interreaction of an intimate blend of a polyetherpolyol, water, surfactant, catalyst, polyisocyanate and a small amount of a chlorinated material selected from the group consisting of polyvinylchloride and chlorinated paraffin is irreversibly heat compressible to 100% set after 5 minutes at 390 to 430° F. to any desired density or configuration. Such foam is useful as flat or waffled rug underlay.

BACKGROUND OF THE INVENTION

Polyetherurethane foams can be compressed and subjected to high temperatures for long periods of time to cause the foam to take on the compressed configuration. This may be accomplished while the foam is curing (U.S. Pat. 3,012,283), after the foam has been cured (U.S. Pat. 3,050,432) or after the foam has been cured and impregnated with polymeric materials (U.S. Pat. 3,400,196). Compression and heat-setting of polyurethane foam during curing requires special equipment such as quick-release treated compression rolls in combination with highly sensitive curing ovens. Compression and heat-setting of cured polyurethane foam requires high temperatures and relatively long times, e.g. 400° F. for 20 to 50 minutes. Compression and heat-setting of cured foams that are impregnated with polymers require further special equipment, e.g. impregnating baths. All of these specialties increase costs and have kept polyurethane foams from economically competing with conventional rubber foams in the rug underlay market. It is, however, desirable to use polyurethane foams for rug underlay as they inherently have a longer useful life and are exceptionally more resistant to fungus and other deterioration than ordinary rubber foam padding.

Where heat and compression setting have been heretofore accomplished, the formulas for the foams have been so significantly altered to permit heat-setting that the same formulation cannot be used for other foam products or is of such a nature that the formulas themselves produce deterioration within the foam. A further difficulty heretofore has been the lack of 100% settability of the foam. The foams tend not to set at the compressed thickness but somewhere between the original and compressed thicknesses giving rise to a variation in thickness of the final product. Such thickness variation makes the foam undesirable for rug underlay.

Therefore, the main objects of this invention are to provide a polyetherurethane foam composition that has improved long term stability, that is rapidly heat-settable under compression to 100% set and that is eminently suitable for use as a rug underlay material and to provide a method for using such a composition to make a compressed foam. Another object is to provide such a foam by making only a small change in a standard formulation so that significant changes are not required when switching from one product to another, i.e., rug underlay to other foam. Other objects are to provide such a heat-settable polyetherurethane foam composition that does not require impregnation by resins or materials and that can be produced under ordinary formulation and processing conditions. These and other objects which are apparent from the following description with the examples and claims appended hereto are satisfied by this invention.

SUMMARY OF THE INVENTION

This invention consists essentially of a polyetherurethane foam composition prepared from an intimate blend of a polyetherpolyol, water, surfactant, catalyst, polyisocyanate and a small amount of chlorinated material selected from the group consisting of polyvinylchloride and chlorinated paraffins with, optionally, a separate blowing agent. The resulting foam is irreversibly heat-compressible to 100% set at a temperature of 390° to 430° F. in as short a time as 3 to 5 minutes but will neither set further nor deteriorate when subsequently subjected to normal useage as a rug underlay at or about room temperature.

DESCRIPTION OF THE PREFERRED EMBODIMENT

This invention pertains to polyurethane foams that are flexible or semirigid as considered by those skilled in the foam art. Of the generally accepted methods of making polyurethane foams the most widely accepted method is to react an organic isocyanate, preferably an aromatic diisocyanate, with a compound containing an active hydrogen, preferably a polyetherpolyol, together with other ingredients such as water, auxiliary blowing agents, catalysts and surface active agents.

Polyetherpolyols are now well known in the art and are generally prepared by reacting a polyhydric alcohol and an alkylene oxide in the presence of a catalyst. Suitable polyhydric alcohols include ethylene glycol, pentaerythritol, methyl glucoside, propylene glycol, 2,3-butylene glycol, 1,3-butylene glycol, 1,5-pentanediol, 1,6-hexanediol, glycerol, trimethylolpropane, sorbitol, sucrose and mixtures thereof. Suitable alkylene oxides include ethylene oxide, propylene oxide, butylene oxide, amylene oxide, epichlorohydrin and mixtures of these. If desired, a portion of the polyhydric alcohol can be replaced with mononuclear diprimary-amines such as ethylene diamine and 1,6-hexane diamine as is well known in the art.

Other polyethers include those prepared by reacting a 1,2-alkylene oxide such as ethylene oxide, propylene oxide, butylene oxide or mixtures thereof with mononuclear polyhydroxy benzenes such as resorcinol, pyrogallol, phloroglucinol, hydroquinone, 4,6-di-t-butylcatechol, catechol, methylphloroglucinol, 2,5,6 - trimethylresorcinol, 4 - ethyl - 5,6 - dimethylresorcinol, n-hexylresorcinol, 4 - chloro - 5 - methylresorcinol and the like. Still other polyethers can be prepared by reacting 1,2-alkylene oxides with polynuclear hydroxybenzenes such as various di-, tri- and tetraphenylol compounds in which two to four hydroxybenzene groups are attached by means of single bonds or by an aliphatic hydrocarbon radical containing 1 to 12 carbon atoms. Examples of diphenylol compounds include 2,2 - bis(p-hydroxyphenyl)propane, bis(p-hydroxyphenyl)methane and the various diphenols and diphenylol methanes disclosed in U.S. Pats. 2,506,486 and 2,744,882.

Exemplary triphenylol compounds which can be employed include the alpha, alpha, omega, tri(hydroxyphenyl) alkanes such as 1,1,2-tris(hydroxyphenyl)ethane;
1,1,3-tris(hydroxyphenyl)propane;
1,1,3-tris(hydroxy-3-methylphenyl)propane;
1,1,3-tris(dihydroxy-3-methylphenyl)propanes;
1,1,3-tris(hydroxy-2,4-dimethylphenyl)propane;
1,1,3-tris(hydroxy-2,5-dimethylphenyl)propane;
1,1,3-tris(hydroxy-2,6-dimethylphenyl)propane;
1,1,4-tris(hydroxyphenyl)butane;
1,1,4-tris(hydroxyphenyl)-2-ethylbutane;
1,1,4-tris(dihydroxyphenyl)butane;
1,1,5-tris(hydroxyphenyl)-3-methylpentane;

1,1,8-tris(hydroxylphenyl)octane;
1,1,10-tris(hydroxylphenyl)decane and the like.

Tetrahydroxyphenyl compounds which can be reacted with 1,2-alkylene oxides include the alpha, alpha, omega, omega-tetrakis-(hydrophenyl)alkanes such as 1,1,2,2-tetrakis(hydroxylphenyl)ethane;
1,1,3,3-tetrakis(hydroxy-3-methylphenyl)propane;
1,1,4,4-tetrakis(hydroxyphenyl)butane;
1,1,4,4-tetrakis(hydroxyxphenyl)-2-ethylbutane;
1,1,5,5-tetrakis(hydroxyphenyl)pentane;
1,1,5,5-tetrakis(hydroxyphenyl)-3-methylpentane;
1,1,5,5-tetrakis(dihydroxyphenyl)pentane;
1,1,8,8-tetrakis(hydroxy-3-butylphenyl)octane;
1,1,8,8-tetrakis(hydroxy-2,5-dimethylphenyl)octane;
1,1,10,10-tetrakis(hydroxyxlphenyl)decane;

and the corresponding compounds which also contain hydroxyl groups in the hdrocarbon chain such as 1,1,6,6-tetrakis(hydroxylphenyl)-2-hydroxyhexane;
1,1,6,6-tetrakis(hydroxyphenyl)-2-hydroxy-5-methylhexane;
1,1,7,7-tetrakis(hydroxylphenyl)-3-hydroxylheptane and the like.

Other suitable polyethers include the 1,2-alkylene oxide derivatives of mononuclear primary amines such as o-, m- and p-phenylenediamine; 2,4- and 2,6-diaminotoluene; 2,6-diamino-p-xylene; 4,6-diamino-m-xylene; 2,4-diamino-m-xylene; 3,5 - diamino-o-xylene; isohexyl-p-phenylenediamine; 3,5-diaminotoluene; methane-bis-o-chloraniline and the like; polynuclear and fused aromatic polyamines such as 1,4-naphthalenediamine;
1,5-naphthalenediamine;
1,8-naphthalenediamine;
benzidine;
toluidine:
4,4'-methylenedianiline;
3,3'-dimethoxy-4,4'-biphenyldiamine;
3,3'-dichloro-4,4'-biphenyldiamine;
3,3'-dimethyl-4,4'-biphenyldiamine;
4,4'-ethylenedianiline;
4,4'-ethylidenedianiline;
2,7-fluorenediamine;
1,4-anthradiamine;
3,3'-biphenyldiamine;
9,10-diaminophenanthrene and
4,4'-diaminoazobenzene.

The polyetherpolyols useable in this invention are liquids or meltable solids having molecular weights of from about 500 to about 5000 and having functionalities of from about 1.5 to less than 3.0.

Auxiliary blowing agents or pneumatogens may be used to supplement the blowing action from the water reaction. Examples of useable penumatogens include halogenated hydrocarbons such as monofluorotrichloromethane, dichlorodifluoromethane, 1,1,2 - trichloro-1,2,2-trifluoroethane, sym-dichlorotetrafluoroethane, ethylene chloride, methylene chloride, chloroform and carbontetrachloride. Other useful foaming agents include lower molecular weight alkanes, alkenes and ethers such as methane, ethane, ethylene, propane, propylene, pentane, hexane, hepetane, diethyl ether, diisopropylether, mixtures thereof and the like. Generally, the halogenated hydrocarbon blowing agents are employed in an amount from about 1 to 50 parts by weight per 100 parts by weight of the polyetherpolyol.

In the polyurethane foaming reaction the organic isocyanate reacts with the polyol and water, fluorocarbons and catalysts wherein the polyol reacts with some of the isocyanate to form a chain-extended polyurethane, more of the isocyanate reacts with the water to form carbamic acid that breaks down to form a primary amine and carbon dioxide, the carbon dioxide and fluorocarbons expand the polyurethane into a cellular structure of foam, and the primary amine formed from the gas reaction reacts with further isocyanate to form a di-substituted urea which in turn reacts with more isocyanate to form crosslinking biuret and allophanate structures.

Generally, water in an amount of 1 to about 5 parts per 100 parts of polyetherpolyol is added to the formulation to help produce carbon dioxide to develop foam structure. The water should be treated to remove impurities such as iron, calcium salts and other materials that produce hardness. Preferably, the water should be subjected to treatment with various zeolites and other molecular sieves or distilled to remove virtually all of the impurities.

A surfactant is added in the range of 0.1 to 5 parts to improve the cell structure and prevent collapsing of the foam during expansion of the pneumatogen. Typical surfactants are the silicone oils and soaps and the siloxane oxyalkylene block copolymers such as those disclosed in U.S. Pat. No. 2,834,748.

Catalysts are added in amounts of from 0.1 to 5 parts to accelerate the different reactions. The chain extension reaction, where the polyol reacts with the isocyanate to produce the polyurethane, is accelerated by tertiary amines, especially when they contain a tin cocatalyst. Examples of tertiary amines include triethylene diamine, tetramethyl butanediamine, triethylamine, n-methylmorpholine, N-ethylmorpholine, diethylethanolamine, N-comorpholine, 1 - methyl-4-dimethylaminoethyl piperazine, N,N - dimethyl - N - (methylisopropylaminopropylene) amine, N,N-diethyl-3-diethylaminopropyl amine and dimethyl benzyl amine. Examples of tin cocatalysts include dibutyl tin dilaurate, stannous chloride, dibutyl tin-di-2-ethyl hexoate, stannous octoate, stannous oleate, tetramethyl tin, tetra-n-butyl tin, di-n-butyl tin dichloride, diisobuyl tin bis(monobutyl maleate), di-n-butyl tin diacetate, di-2-ethylhexyl tin bis(2-ethyl hexoate), tri-n-butyl tin acetonate and dibutyl tin distearate.

A wide variety of polyisocyanate compounds can be used in the polyurethane reaction. Examples of some of these include pure and mixtures of toluene 2,4- and 2,6-diisocyanate;
4,4'-methylene-di-ortho-tolylisocyanate;
2,4,4'-triisocyanatodiphenylether;
toluene-2,3,6-triisocyanate;
1-methoxy-2,4,6-benzenetriisocyanate;
meta-phenylenediisocyanate;
4-chloro-meta-phenylenediisocyanate;
4,4'-biphenyldiisocyanate;
1,5-naphthalenediisocyanate;
tetramethylenediisocyanate-1,4;
hexamethylenediisocyanate-1,6-;
decamethylenediisocyanate-1,10;
1,4-cyclohexanediisocyanate;
1,2-ethylenediisocyanate;
diphenylmethane-p,p'- or m,m'-diisocyanate;
bis(4-isocyanatocyclohexyl)methane
stilbene diisocyanates;
dixylylmethane diisocyanates;
2,2-bis(4-isocyanatophenyl)propane;
diphenylmethane tetraisocyanates;
trimethylbenzene triisocyanates;
ditolylmethane triisocyanates;
triphenylmethane triisocyanates;
3,3'-dimethyldiphenylene-4,4'-diisocyanate;
3,3'-dimethoxydiphenylene-4,4'-diisocyanate;
diphenyl triisocyanates and
diphenylcyclohexane-p,p'-diisocyanate.

It is to be understood that mixtures of two or more of these polyisocyanates can be employed. Aromatic isocyanates are preferred, particularly the toluene diisocyanates The chlorinated material useable in this invention must contain at least 0.2 chlorine atom per carbon atom, preferably at least 0.25 chlorine atom per carbon atom. It is suspected that under the particular conditions of the method of this invention there is an evolution of hydrogen chloride which causes sufficient restructuring of the polyurethane foam to accomplish the desired 100% set. However, this invention is not to be limited by this hypothesis.

One particular preferred class of chlorinated material is that made up of polyvinyl chloride (PVC) polymers that contain at least 0.4 chlorine atom per carbon atoms, preferably about 0.5 to 0.7 chlorine atom per carbon atom, but no more than about one chlorine atom per carbon atom. These polymers are preferably finely divided and have an intrinsic viscosity from about 0.25 to 2.5, preferably from about 0.5 to 1.5, as measured in 0.3 percent by weight solution in cyclohexanone at 25° C. These polymers can be made by bulk, solvent, emulsion or suspension polymerization processes, preferably the suspension polymerization process. The preferred PVC polymers are the so-called "blending" resins which are generally recommended for processing at temperatures in the range of about 325 to 365° F. Such polymers will soften to the desired stickiness within 3 minutes of heating at 390 to 430° F. PVC polymers having higher softening temperatures may require longer heating periods for higher temperatures. The problem of attaining the desired stickiness may be further complicated by the presence of an emulsifier in a plastisol resin, also necessitating higher temperatures or longer times. It is submitted that the stickiness of the PVC polymers may work together with the suspected restructuring of the polyurethane foam, but this invention is not to be limited by such an hypothesis.

One particularly useful commercially available polyvinyl chloride compound which was employed in the examples below is a medium molecular weight PVC resin in the form of a white powder having an intrinsic viscosity of 1.03 as measured in a 0.3 percent solution in cyclohexanone at 25° C., a specific gravity of 1.40 and a bulk density of 0.46 gram/cc. and has the following wet United States Sieve Analysis:

Percent on 40 mesh _____ 0
Percent on 80 mesh _____ 0
Percent on 100 mesh _____ 9
Percent on 140 mesh _____ 45
Percent on 170 mesh _____ 15
Percent on 200 mesh _____ 12
Percent through 200 mesh _____ 19

The other preferred class of chlorinated material useable herein is that made up of chlorinated paraffins. The chlorinated paraffins are generally liquids so that there is no consideration of softening temperatures. However, these materials have been found to work in this invention. A typical commercial chlorinated paraffin employed in Example I below is a pale yellow, clear, viscous liquid having an approximate molecular weight of 530, an approximate density at 25° C. of 1.16 g./ml., an approximate viscosity at 25° C. of 25 poises, an approximate refractive index at 25° C. of 1.505, an approximate chlorine content of 42 percent by weight, equivalent to about 0.28 chlorine atom per carbon atom and a thermal stability of 0.2 percent measured as the weight percent of hydrogen chloride, based on the weight of the chlorinated paraffin, evolved during four holes at 175° C.

The chlorinated materials useable in this invention can be used in the range of 0.1 to 100 parts by weight per 100 parts of polyetherpolyol. However, operable results are attained with the use of from 0.1 to 5 parts. Greater amounts than 1.1 to 5 parts may be used to obtain additional benefits such as fire retardancy or self-extinguishment as is already known in the art.

Other materials can be added to the above formulation that do not enter into the reaction or that do not change the form of the urethane foam ultimately produced. These materials include fillers such as cork dust, wood dust, calcium carbonate, glass fibers, fuller's earth, titanium dioxide and the like. Still other materials include colorants such as pigments and dyes.

The above listed ingredients are generally blended together in a high speed, high shear mixing head and deposited on a traveling belt so that the foam develops and rises producing an inclined foam front that ultimately reaches a maximum which thereafter remains constant. The foam is cured thereafter at room temperature or above. The foam is then compressed to a desired configuration and is heated to take a 100% set in the compressed configuration. The foam can be compressed from 1 to 99% of its original height. Generally speaking, a thickness reduction of 50 to 95% is useful for rug padding. The foam is heated to a temperature of between 390° F. to 430° F. to obtain a set in the foam. At temperatures below 390° F. the set of the foam is not 100% and therefore quality control is diminished. Full set is reached at temperatures of 430° F. and thus higher temperatures while permissible are not required. At the temperature range of 390° to 430° F. compression time can be as little as three minutes which makes the process of setting this particular polyetherurethane foam extremely commercially desirable. This particular polyetherurethane foam is particularly adaptable to the waffle pattern occasioned by introducing a layer of the polyetherurethane foam onto a moving chain grate, substantially compressing the foam layer by the use of overpressing plates and rollers, and then slowly passing the compressed foam through a heating oven having a temperature of from 390° to 430° F. for at least three minutes to obtain a 100% set, densified polyurethane foam having a waffle pattern on one side thereof.

The following examples illustrate the best presently-known mode of practicing the invention and are not to be construed as limiting the invention. Unless otherwise noted, all quantitative measurements are by weight.

EXAMPLE I

Flexible polyetherurethane foams were prepared according to the recipes set forth below in Table I. In each case, all of the ingredients except the polyisocyanate were thoroughly blended together. Thereafter, the blend and the polyisocyanate were separately introduced into the head of a high shear mixer and thoroughly blended. The output from the mixing head was poured onto a polytetrafluoroethylene coated sheet wherein the foam thereafter rose and set at thicknesses above one inch. The foam was thereafter fully cured at 250° F. for 20 minutes.

Twelve inch x twelve inch x one inch thick sheets of foam were cut from each sample and compressed to ½ inch between ¼ or ½ inch thick aluminum plates. The sheets were thereafter subject to various temperatures for various times. The samples were thereafter cooled, their thickness measured and their permanent set calculated. These thicknesses appear in Table II below.

TABLE I

| Ingredients | A | B | C | D | E | F | G | H |
|---|---|---|---|---|---|---|---|---|
| Polyether polyol [1] | 100 | 100 | 100 | 100 | 100 | 100 | 100 | 100 |
| Water [2] | 2.5 | 4.5 | 4.0 | 4.0 | 4.0 | 4.0 | 4.0 | 4.0 |
| Surfactant [3] | 0.5 | 1.0 | 1.0 | 1.0 | 1.0 | 1.0 | 1.0 | 1.0 |
| Catalyst [4] | 0.3 | 0.24 | 0.24 | 0.24 | 0.24 | 0.24 | 0.24 | 0.24 |
| Catalyst [5] | 0.4 | 0.25 | 0.4 | 0.25 | 0.25 | 0.25 | 0.25 | 0.25 |
| Auxiliary flurocarbon blowing agent | | 3.0 | | | | | | |
| Polyvinyl chloride [6] | 50 | | | 2 | 5 | | | |
| Chlorinated paraffin [7] | | | 15 | | | 2 | 5 | |
| Polyisocyanate [8] | 36 | 59.7 | 50 | 50 | 50 | 50 | 50 | 50 |

[1] 3,000 mw. polyoxypropylene triol.
[2] Deionized and filtered.
[3] Silicone surfactant.
[4] 33% triethylene diamine in dipropylene glycol.
[5] Stannous octoate.
[6] The specific PVC resin described above in the specification.
[7] The commercial chlorinated paraffin described above in the specification.
[8] An 80/20 mixture of 2,4-toluenediisocyanate and 2,6-toluenediisocyanate isomers.

TABLE II

| Sample | Compression temperature (° F.) | Compression time, minutes | Percent set |
|---|---|---|---|
| A | 425 | 5 | 100 |
| B | 425 | 5 | 25 |
| B | 425 | 3 | 25 |
| C | 425 | 3 | 100 |
| D | 340 | 3 | 0 |
| D | 360 | 3 | 75 |
| D | 380 | 3 | 80 |
| D | 400 | 3 | 100 |
| D | 420 | 3 | 100 |
| E | 340 | 3 | 0 |
| E | 360 | 3 | 75 |
| E | 380 | 3 | 87 |
| E | 400 | 3 | 100 |
| E | 420 | 3 | 100 |
| F | 340 | 3 | 0 |
| F | 360 | 3 | 40 |
| F | 380 | 3 | 65 |
| F | 400 | 3 | 87 |
| F | 420 | 3 | 100 |
| G | 340 | 3 | 0 |
| G | 360 | 3 | 70 |
| G | 380 | 3 | 75 |
| G | 400 | 3 | 87 |
| G | 420 | 3 | 100 |
| H | 420 | 3 | 40 |

This example shows that a polyetherurethane foam that does not contain a chlorinated material selected from the group consisting of polyvinyl chloride and chlorinated paraffins will not take a 100% set under compression when heated to between 390° and 430° F. for a period of time from 3 to 5 minutes whereas similar foams containing the defined chlorinated materials can be 100% compression set under the same conditions.

EXAMPLE II

Run D of Example I was repeated three times except that the amounts of polyvinyl chloride were set at 1, 0.5 and 0.1 part respectively per 100 parts of polyetherpolyol instead of the 2 parts of polyvinyl chloride. The results were as follows:

TABLE III

| Sample | PVC (parts) | Compression temperature (° F.) | Compression time, minutes | Percent set |
|---|---|---|---|---|
| J | 1 | 340 | 3 | 0 |
| J | 1 | 360 | 3 | 87 |
| J | 1 | 380 | 3 | 94 |
| J | 1 | 400 | 3 | 100 |
| J | 1 | 420 | 3 | 100 |
| K | 0.5 | 340 | 3 | 0 |
| K | 0.5 | 360 | 3 | 87 |
| K | 0.5 | 380 | 3 | 94 |
| K | 0.5 | 400 | 3 | 100 |
| K | 0.5 | 420 | 3 | 100 |
| L | 0.1 | 340 | 3 | 0 |
| L | 0.1 | 360 | 3 | 75 |
| L | 0.1 | 380 | 3 | 87 |
| L | 0.1 | 400 | 3 | 94 |
| L | 0.1 | 420 | 3 | 100 |

This example shows that as little as 0.1 part of PVC per 100 parts of polyetherpolyol in a cured polyetherurethane foam will cause the foam to take a 100% set under compression when heated to between 390° and 430° F. for a period of 3 to 5 minutes.

What is claimed is:

1. A method of preparing polyetherurethane foam of desired permanent configuration which comprises (1) compressibly molding a fully-cured polyetherurethane foam consisting essentially of, in the unreacted state, an intimate blend of:
   (a) a polyetherpolyol having a molecular weight from 500 to 5000 and a hydroxy functionality of from 1.5 to 3.0;
   (b) deionized water in an amount of from 1 to 5 parts by weight per 100 parts of polyol;
   (c) a surfactant in an amount of from 0.1 to 5 parts by weight per 100 parts of polyol;
   (d) a urethane reaction catalyst compound in an amount of from 0.1 to 5 parts by weight per 100 parts of polyol;
   (e) a polyisocyanate; and
   (f) a chlorinated hydrocarbon material containing an average of from 0.2 to 1 chlorine atom per carbon atom, said hydrocarbon material being present in an amount from 0.1 to 100 parts by weight per 100 parts of polyol,
at a temperature of at least 390° F. for a time sufficient to set permanently said foam to the desired configuration, said time being no greater than about 5 minutes and (2) cooling said compressibly molded foam.

2. The method of claim 1 wherein said chlorinated material is a finely-divided particulate polyvinyl chloride polymer containing from 0.4 to 0.7 chlorine atom per carbon atom.

3. The method of claim 1 wherein said chlorinated material is a liquid chlorinated paraffin.

4. The method of claim 1 wherein the temperature in step (1) is no greater than about 430° F.

5. A method of preparing polyetherurethane foam of desired permanent configuration which comprises (1) preparing a polyetherurethane foam formulation consisting essentially of, in the unreacted state, an intimate blend of:
   (a) a polyetherpolyol having a molecular weight from 500 to 5000 and a hydroxy functionality of from 1.5 to 3.0;
   (b) deionized water in an amount of from 1 to 5 parts by weight per 100 parts of polyol;
   (c) a surfactant in an amount of from 0.1 to 5 parts by weight per 100 parts of polyol;
   (d) a urethane reaction catalyst component in an amount of from 0.1 to 5 parts by weight per 100 parts of polyol;
   (e) a polyisocyanate; and
   (f) a chlorinated hydrocarbon material containing an average of from 0.2 to 1 chlorine atom per carbon atom, said hydrocarbon material being present in an amount from 0.1 to 100 parts by weight per 100 parts of polyol,
(2) allowing said foam formulation to cure fully, (3) compressibly molding said cured foam at a temperature of at least 390° F. for a time sufficient to set permanently said foam to the desired configuration, said time being no greater than about five minutes and (4) cooling said compressibly molded foam.

6. The method of claim 5 wherein said chlorinated material is a finely-divided particulate polyvinyl chloride polymer containing from 0.4 to 0.7 chlorine atom per carbon atom.

7. The method of claim 5 wherein said chlorinated material is a liquid chlorinated paraffin.

8. The method of claim 5 wherein the temperature in step (3) is no greater than about 430° F.

9. A compressibly molded foam produced in accordance with claim 1.

References Cited

UNITED STATES PATENTS 3,400,196   9/1968   LeRoy _____ 264—280
3,650,993   3/1972   Zocco et al. _____ 264—54

M. J. WELSH, Primary Examiner

U.S. Cl. X.R.

260—2.5 BE, 2.5 AL

PO-1050
(5/69)

UNITED STATES PATENT OFFICE
CERTIFICATE OF CORRECTION

Patent No. 3,801,687                     Dated   April 2, 1974

Inventor(s)   David S. Cobbledick

It is certified that error appears in the above-identified patent and that said Letters Patent are hereby corrected as shown below:

Column 3, line 16, which reads: "hydroxylphenyl" should read ---hydroxylphenyl---.

Column 3, line 18, which reads: "ndrocarbon" should read ---hydrocarbon---.

Column 3, line 64, which reads: "hepetane" should read ---heptane---.

Column 5, line 64, which reads: "holes" should read ---hours---.

Signed and sealed this 1st day of October 1974.

(SEAL)
Attest:

McCOY M. GIBSON JR.
Attesting Officer

C. MARSHALL DANN
Commissioner of Paten